United States Patent [19]

Katz

[11] 4,403,731
[45] Sep. 13, 1983

[54] INTEGRATED HEAT PUMP AND HEAT STORAGE SYSTEM

[75] Inventor: Ami Katz, Ramat Gan, Israel

[73] Assignee: Electra (Israel) Ltd., Tel Aviv, Israel

[21] Appl. No.: 357,648

[22] Filed: Mar. 12, 1982

[30] Foreign Application Priority Data

Mar. 13, 1981 [IL] Israel .......................................... 62344

[51] Int. Cl.$^3$ .............................................. F24D 11/02
[52] U.S. Cl. ................... 237/2 B; 62/324.1; 62/430; 165/7; 165/48 R; 165/18
[58] Field of Search .................... 165/18, 48, 29, 7; 62/324.1, 324.6, 430, 437, 238.6, 238.7, 260; 237/2 B

[56] References Cited

U.S. PATENT DOCUMENTS

| 2,677,243 | 5/1954 | Telbes | 165/18 X |
|---|---|---|---|
| 2,723,083 | 11/1955 | Bary | 165/18 X |
| 4,066,118 | 2/1978 | Goettl | 165/18 |
| 4,100,092 | 7/1978 | Spauschus et al. | 62/324.6 X |
| 4,213,447 | 7/1980 | Erickson | 126/430 X |
| 4,231,885 | 11/1980 | Rueffel | 126/430 X |
| 4,304,219 | 12/1981 | Currie | 126/430 X |

Primary Examiner—Albert W. Davis, Jr.
Attorney, Agent, or Firm—Browdy & Neimark

[57] ABSTRACT

An integrated heat pump and heat storage system comprising a heat pump, a first conduit for supplying return air from an enclosure to the heat pump, a second conduit for supplying heated air from the heat pump to the enclosure, heat storage apparatus, a first damper operative in a first orientation to permit return air from the enclosure to enter the first conduit and to prevent return air from passing through the heat storage apparatus and operative in a second orientation to cause return air to pass through the heat storage apparatus for being heated thereby before entering the first conduit, a second damper operative in a first orientation to cause heated air from the second conduit to pass through the heat storage apparatus for giving up a portion of its heat for storage and operative in a second orientation to prevent heated air from the second conduit from passing through the heat storage apparatus and to permit the heated air from the second conduit to reach the enclosure. The heat storage apparatus may comprise phase change materials.

3 Claims, 3 Drawing Figures

INTEGRATED HEAT PUMP AND HEAT STORAGE SYSTEM

FIELD OF THE INVENTION

The present invention relates generally to heating apparatus and more particularly to heating apparatus employing heat pumps.

BACKGROUND OF THE INVENTION

The use of heat pumps for space heating of air is well known. One conventional type of heat pump, the air to air heat pump, normally draws heat from the air outside an enclosure and uses it to upgrade the temperature of air within the enclosure. It is appreciated that the operating coefficient and thus the efficiency of the heat pump is a positive function of the temperature of the heat supplying medium, i.e. the outside air.

The use of phase-change materials as a heat-storage medium has been proposed in the literature. An example of a heat-storage system using phase-change materials is described in applicant's pending Israel Patent Application Ser. No. 62355.

SUMMARY OF THE INVENTION

The present invention seeks to provide an integrated heat pump and heat storage system which employs phase-change materials to advantage as a heat storage medium in combination with a heat pump which can be operated under conditions of relatively high efficiency.

There is thus provided in accordance with an embodiment of the present invention an integrated heat pump and heat storage system comprising a heat pump, a first conduit for supplying return air from an enclosure to the heat pump, a second conduit for supplying heated air from the heat pump to the enclosure, heat storage apparatus, a first damper operative in a first orientation to permit return air from the enclosure to enter the first conduit and to prevent return air from passing through the heat storage apparatus and operative in a second orientation to cause return air to pass through the heat storage apparatus for being heated thereby before entering the first conduit; a second damper operative in a first orientation to cause heated air from the second conduit to pass through the heat storage apparatus for giving up a portion of its heat for storage and operative in a second orientation to prevent heated air from the second conduit from passing through the heat storage apparatus and to permit the heated air from the second conduit to reach the enclosure.

Further in accordance with an embodiment of the present invention, the first damper is operative when in its second orientation to prevent return air from directly entering the first conduit and the second damper is operative when in its first orientation to prevent heated air from the second conduit from directly passing to the enclosure without first passing through the heat storage apparatus.

Additionally in accordance with an embodiment of the present invention, the heat storage apparatus comprises phase change materials.

BRIEF DESCRIPTION OF THE DRAWINGS

The present invention will be more fully understood and appreciated from the following detailed description taken in conjunction with the drawing in which.

DETAILED DESCRIPTION OF THE INVENTION

The invention will now be described in detail with reference to FIGS. 1 and 2 which illustrate the invention with dampers in respective first and second orientations, corresponding to operation during the day and the night respectively.

Figure 1:
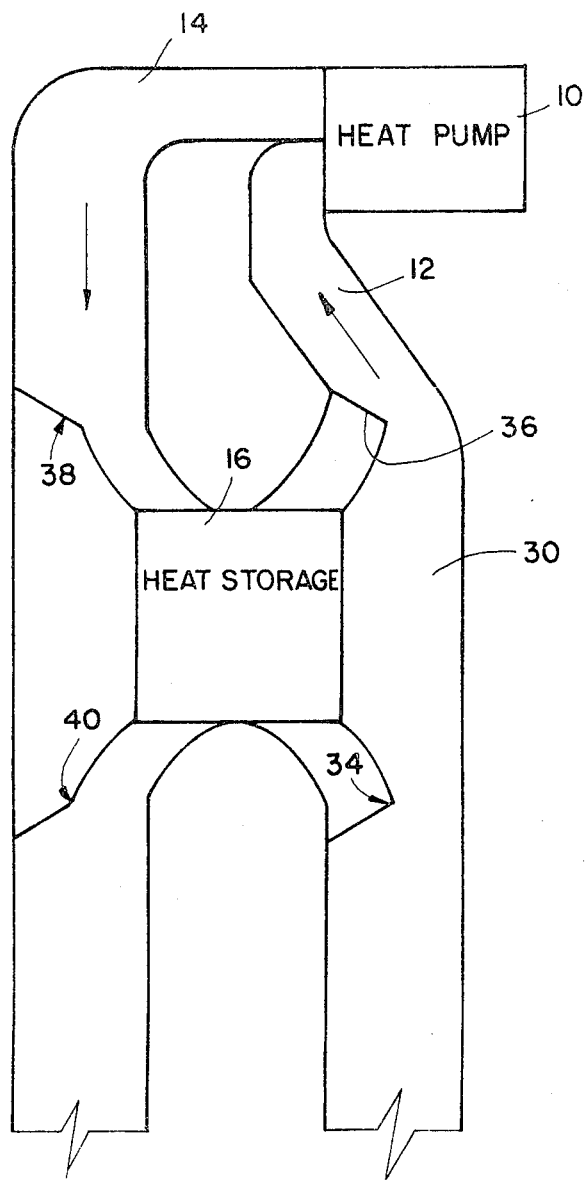
FIG. 1 is a schematic illustration of an integrated heat pump and heat storage system constructed and operative in accordance with an embodiment of the present invention with the dampers in their respective first orientations.
Figure 2:
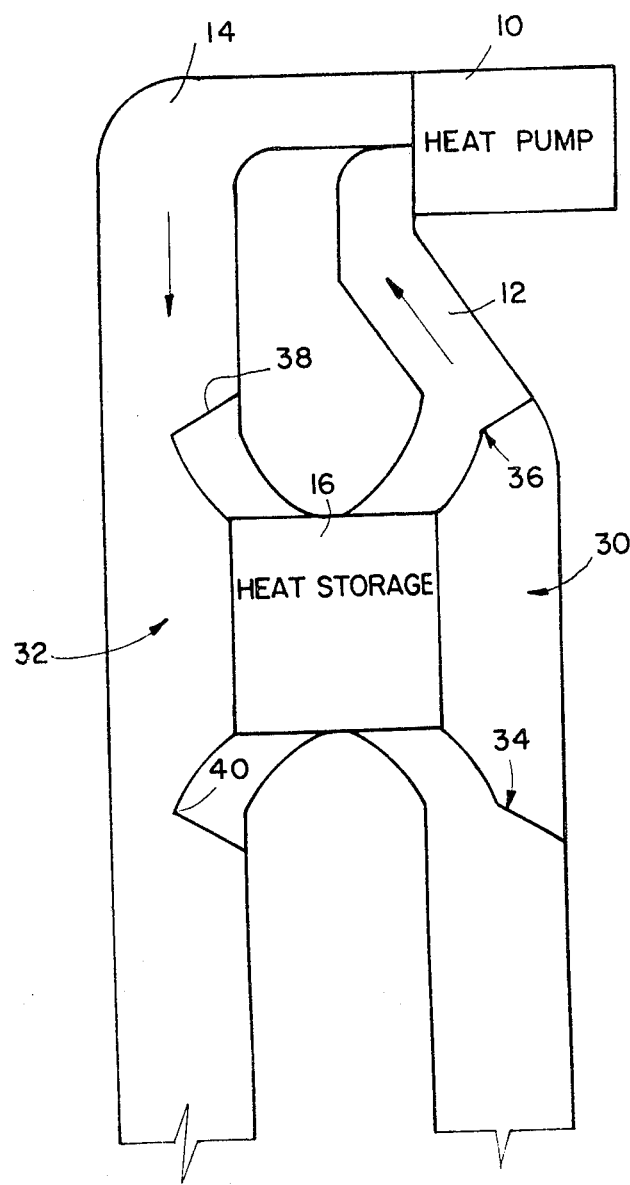
FIG. 2 is a schematic illustration of the integrated heat pump and heat storage system of FIG. 1 with the dampers in their respective second orientations.

As seen in FIGS. 1 and 2 the apparatus of the present invention comprises a heat pump 10, here selected to be of the air to air type. It is appreciated that according to an alternative embodiment of the invention other types of heat exchangers may be used. A typical heat pump useful in the invention is a model ERU or EHN manufactured by ELECTRA (Israel) Ltd.

Heat pump 10 communicates with the outside atmosphere via air circulation ducts which are not shown here for the sake of simplicity and clarity of illustration. A first conduit 12 supplies return air to the heat pump 10 from an enclosure and a second conduit 14 supplies heated air from the heat pump 10 to the enclosure. Heat storage apparatus 16 is provided for selectable communication with the first and second conduits and with the air flows to and from the enclosure.

Heat storage apparatus 16 may be any suitable heat storage apparatus. According to a preferred embodiment of the invention, the heat storage apparatus comprises phase change material such as Calcium chloride hexahydrate with suitable additives to improve its operating lifetime and characteristics. Heat storage apparatus of this type is described in the following publication:

HEAT TRANSFER PROPERTIES OF A HEAT-OF-FUSION STORE BASED ON $CaCl_2.6H_2O$ by R. Carlson and G. Wettermark, Solar Energy, Vol. 24, pp. 239–247 (1979).

Figure 3:
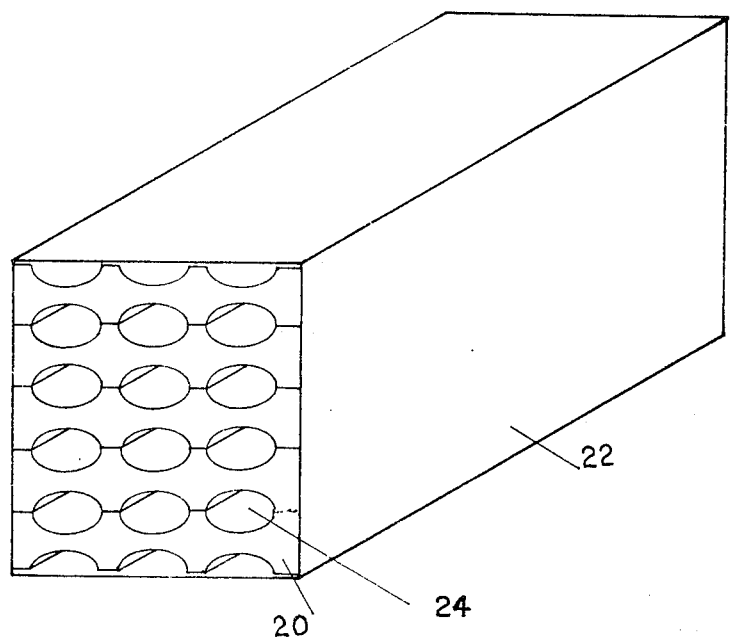
FIG. 3 is a schematic illustration of a heat storage system employing phase change materials useful in the invention.

A suitable heat storage installation may comprise a plurality of modular elements of the type seen in FIG. 3. Each modular element comprises a plurality of elements 20 which contain phase change material, typically calcium chloride hexahydrate. The elements are arranged in a parallel array within an enclosure 22 and are spaced from each other along at least a portion of the surface thereof such that air flow channels 24 are defined therealong for permitting a heat exchange air flow therethrough.

Selectable communication between the air flows to and from the heat pump and enclosure is provided by first and second damper assemblies 30 and 32. First damper assembly 30 comprises first and second vanes 34 and 36. Vane 34 governs the entry of return air from the enclosure and determines whether it passes directly to the heat pump via the first conduit or whether it first passes through the heat storage apparatus 16. Vane 36 governs the communication between the heat storage apparatus 16 and the first conduit.

Second damper assembly comprises third and fourth vanes 38 and 40. Third vane 38 governs the supply of heated air from the heat pump via the second conduit 14 and determines whether it passes directly to the enclosure or alternative first passes through the heat storage apparatus 16. Fourth vane 40 governs the communication between the heat storage apparatus 16 and the enclosure for air flows into the enclosure.

Particular reference is now made to FIG. 1 which illustrates the first and second damper assemblies arranged in their respective first orientations for operation during the day. In this arrangement, when the heat pump 10 is operating at a high operating coefficient and thus at high efficiency and thus may economically produce more heat than is currently required in the enclosure, heat storage is provided. The provision of heat storage is effected by channeling the heated air from the heat pump via the second conduit 14 and via the third vane 38 to the heat storage apparatus. The heated air gives up a portion of its heat to the heat storage medium for storage and then passes via vane 40 to the enclosure.

In this arrangement, the return air is supplied directly from the enclosure via first vane 34 and second vane 36 which isolate the heat storage apparatus 16 from the return air flow.

In the arrangement illustrated in FIG. 1 and described above each of vanes 34, 36, 38 and 40 will be considered to be in its first orientation.

Reference is now made to FIG. 2 which illustrates the first and second damper assemblies arranged in their respective second orientations for operation during the night. In this arrangement, when the heat pump is operating at a relatively low operating coefficient and may not be able to supply all of the heat required in the enclosure, the use of stored heat is provided. The provision of stored heat is effected by channelling the return air from the enclosure via the heat storage apparatus 16 for picking up stored heat therefrom.

As seen in FIG. 2, the return air from the enclosure is supplied to the heat storage apparatus 16 via vane 34 and the air passing through the heat storage apparatus 16 and thus heated thereby is supplied via vane 36 to the heat pump via the first conduit 12. The heated air output of the heat pump 10 is supplied directly to the enclosure via the second conduit 14 and vanes 38 and 40 which isolate the heat storage apparatus from the heated air flow.

It is appreciated that the provision of stored heat from the heat storage apparatus 16 may be employed to reduce the required operation of the heat pump under conditions of low operating efficiency and may lessen the requirement for additional heat upgrading such as by electrical or other heat sources. Significant economic advantages may thus be realized.

It will be appreciated by persons skilled in the art that the invention is not limited to what has been particularly shown and described hereinabove. Rather the scope of the present invention is defined only by the claims which follow:

I claim:

1. An integrated heat pump and heat storage system comprising:

a heat pump;

a first conduit for supplying return air from an enclosure to said heat pump;

a second conduit for supplying heated air from said heat pump to said enclosure;

heat storage means selectably communicating with said first and second conduits;

first damper means operative in a first orientation to permit return air from said enclosure to enter said first conduit and to prevent return air from passing through said heat storage means and operative in a second orientation to cause return air to pass through said heat storage means for being heated thereby before entering said first conduit; and second damper means operative in a first orientation to cause heated air from said second conduit to pass through said heat storage means for giving up a portion of its heat for storage and operative in a second orientation to prevent heated air from said second conduit from passing through said heat storage means and to permit heated air from said second conduit to reach said enclosure.

2. A system according to claim 1 and wherein said first damper is operative when in its second orientation to prevent return air from directly entering said first conduit and said second damper is operative when in its first orientation to prevent heated air from said second conduit from directly passing to said enclosure without first passing through said heat storage means.

3. A system according to claim 1 or claim 2 and wherein said heat storage means comprises phase change materials.

* * * * *